United States Patent [19]

Fowler

[11] 4,059,666

[45] Nov. 22, 1977

[54] METHOD OF CONVERTING OIL AND WASTE CONTAINING SLUDGE TO DRY WASTE

[76] Inventor: Leslie L. Fowler, 1722 E. 59 St., Tulsa, Okla. 74105

[21] Appl. No.: 568,778

[22] Filed: Apr. 17, 1975

Related U.S. Application Data

[63] Continuation of Ser. No. 408,671, Oct. 23, 1973, abandoned.

[51] Int. Cl.$^2$ ............................................. B29C 25/00
[52] U.S. Cl. ..................................... 264/129; 427/212
[58] Field of Search .................... 264/129; 106/89, 97, 106/98, 99, 287 R; 427/212

[56] References Cited

U.S. PATENT DOCUMENTS

| | | | |
|---|---|---|---|
| 1,895,159 | 1/1933 | Greenwalt | 106/40 R |
| 3,030,222 | 4/1962 | Eichenlaub | 106/97 |
| 3,451,185 | 6/1969 | Tezuka | 264/129 |

*Primary Examiner*—Lorenzo B. Hayes
*Attorney, Agent, or Firm*—Head, Johnson & Chafin

[57] ABSTRACT

This disclosure is a method of converting oil and water containing sludge to dry waste in a plurality of steps as follows:

1. Adding to the sludge a petrophylic material to absorb the oil and to separate out the water which is permitted to drain.

2. Adding fibrous material for strength to bond the petrophylic material.

3. Having drained the excess water from the sludge add hydrophylic material to absorb any of the water which may be intermixed.

4. Sealing the external surface of the substantially dry material.

1 Claim, No Drawings

METHOD OF CONVERTING OIL AND WASTE CONTAINING SLUDGE TO DRY WASTE

This is a continuation of application Ser. No. 408,671, filed Oct. 23, 1973 now abandoned.

BACKGROUND OF THE INVENTION

This invention lies in the field of ecology and environmental protection. More particularly it is concerned with the disposal of quantities of hydrocarbon sludge, such as bottom sediments and water (commonly called in the petroleum industry BS&W) and other oily waste materials. It is still more particularly related to methods of disposing of such oily wastes in such a manner that there is no drainage or loss that would disturb the environment, and the resulting material can be used for various useful purposes.

In the prior art, material of this nature, such as BS&W, that is, which result from oil field operations and the scrapings of oil storage tanks are generally disposed of by spreading in the form of shallow ponds where part of the water is permitted to evaporate and the oily material is then burned. This results in the formation of dense clouds of black smoke which pollute the atmosphere and cause damage to vegetation.

SUMMARY OF THE INVENTION

It is a primary object of this invention to provide a means of utilization of waste oily sludge materials, and converting them into the form of dry waste, so that they can be utilized for useful purposes without permitting any danger to the ecology.

This and other objects are realized and the limitations of the prior art are overcome in this invention by a plurality of steps of:

1. mixing with the sludge a quantity of petrophylic material to absorb the oily matter from the sludge;
2. permitting the water in the sludge to drain after the oily material has been absorbed so that there is a minimum of water left in the mixture;
3. adding to the mixture of sludge and petrophylic material a quantity of fibrous material to bond together the particles of petrophylic material;
4. adding to the mixture a hydrophylic material to absorb and bind the remaining water so that there will be no further drainage of water or of oil;
5. forming this material into suitably-sized packages for use in various operations such as road building landfill, etc.; and
6. sealing the external surface of these packages so as to ensure that there will be no drainage of either oil or water from the packages.

DESCRIPTION OF THE PREFERRED EMBODIMENT

The objective of this invention is to provide some means of disposing of waste sludge, BS&W and similar materials, without creating a disturbance to the environment. In general this is accomplished by mixing with the sludge various materials which will absorb the oily components of the sludge and thus permit the mixed water, left free of oil, to drain from the mixture, adding fibrous materials to support and strengthen the formation of selected sizes packages of substantially dry waste, adding to the mixture of petrophylic and fibrous materials additional hydrophylic material for absorbing and retaining any water which may remain in the mixture and thereafter taking the substantially dry mixture and sealing the external surface of the packages so that they can be transported and handled without leaking either the water or the oil from the packages.

In the first step the purpose is to break up the mixture of oily matter and water in the sludge and absorb the oil into materials which are preferentially wet by oil, such as waste felt from the manufacturing of roofing felts, etc. and other similar materials. There are many synthetic plastic fibers such as polyurethane, which are preferentially wet by oily matter. Waste portions of fine fibers of these materials can also be used as an absorbent for the petroleum components of the sludge. As the sludge and the petrophylic material is mixed, opportunity should be provided for permitting the entrained water from the sludge to be freed and to drain away from the mixture.

There is then added to the mixture some fibrous material to provide strength to the resulting packages that will be formed. Such materials as fiberglass wastes, chopped glass fibers, Spanish moss, hay, straw, cornstalks and similar waste materials can be used for this purpose.

Even though most of the water from the sludge has been permitted to drain there will be still entrained in the petrophylic material and the fibrous material some quantities of water. There is then added to the mixture a hydrophylic material such as volcanic ash, bentonite, or other water absorbing materials. The quantities of the petrophylic and hydrophylic materials added should be judged on the basis of the amount of oily material and water in the original sludge so that the resulting mixture is reasonably dry and there is no further drainage of oil or water from the mixture.

The next step is to separate the mixture into quantities which form suitably sized packages of dry material. If desired, these can be further dried in the air or by warming. They are then coated with a water seal. The material such as sodium silicate, or plastic, or asphalt tar can be applied to the surface for the purpose of sealing in all the moisture and oil that has been absorbed on the materials added in the processing. The resulting packages are then in condition to be handled, transported, and used as road bed or road surfacing in mixture with other materials, or in landfill or so on.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. The method of converting oil and water containing sludge to dry waste comprising the steps of:
    1. adding to the sludge petrophylic material selected from the group consisting of waste roofing felt and polyurethane fibers, in an amount sufficient to absorb the oily component of the sludge material;
    2. adding to the mixture of sludge and petrophylic material fibrous material selected from the group consisting of fiberglass wastes, chopped glass fibers, Spanish moss, hay, straw and cornstalks in an amount sufficient to strengthen and bond the particles of petrophylic material;

3. allowing the entrained water to drain from the mixture as the oil components of the sludge are absorbed in the petrophylic material;
4. adding to the mixture a hydrophylic material selected from the group consisting of volcanic ash and bentonite in an amount sufficient to absorb and bond the remaining water in the mixture;
5. forming the mixture into suitably sized volumes or packages; and
6. coating the external surface of said packages with an air drying liquid selected from the group consisting of sodium silicate, and asphalt tar to form a water impervious layer thereon.

* * * * *